United States Patent [19]

Toy et al.

[11] 4,149,016

[45] Apr. 10, 1979

[54] PERFLUOROETHERS

[75] Inventors: Madeline S. Toy, Palo Alto; Roger S. Stringham, Woodside, both of Calif.

[73] Assignee: The United States of America as represented by the Secretary of the Air Force, Washington, D.C.

[21] Appl. No.: 852,114

[22] Filed: Nov. 16, 1977

Related U.S. Application Data

[62] Division of Ser. No. 771,853, Feb. 23, 1977, Pat. No. 4,077,857.

[51] Int. Cl.² ............................................. C07C 43/18
[52] U.S. Cl. ..................................... 568/664; 252/77; 252/67; 252/65
[58] Field of Search .................................... 260/611 R

[56] References Cited

U.S. PATENT DOCUMENTS

| | | | |
|---|---|---|---|
| 2,982,786 | 5/1961 | McCane | 260/611 R |
| 3,242,218 | 3/1966 | Miller | 260/615 |
| 3,397,191 | 8/1968 | Beckerbauer | 260/615 X |
| 3,435,078 | 3/1969 | Nychka | 260/615 |
| 3,514,487 | 5/1970 | Anello et al. | 260/614 |
| 4,024,192 | 5/1977 | Benninger et al. | 260/611 R |

OTHER PUBLICATIONS

Toy et al., Chem. Abs. vol. 85, (1976) 20643v.
Cady, Proceedings of the Chemical Society, Apr. 1960, 133 & 136.

*Primary Examiner*—Bernard Helfin
*Attorney, Agent, or Firm*—Joseph E. Rusz; Sherman H. Goldman

[57] ABSTRACT

A method for synthesizing perfluoropolyethers by effecting addition reactions under low temperature photolysis between perfluoroolefins, perfluorodialkyl peroxides and fluoroxyperfluoroalkanes resulting in the snythesis of new compounds.

2 Claims, No Drawings

PERFLUOROETHERS

CROSS REFERENCE TO RELATED APPLICATION

This application is a divisional of U.S. Patent Application Ser. No. 771,853, filed Feb. 23, 1977 and now U.S. Pat. No. 4,077,857.

STATEMENT OF GOVERNMENT INTEREST

The invention described herein may be manufactured and used by or for the Government for governmental purposes without the payment of any royalty thereon.

BACKGROUND OF THE INVENTION

This invention relates to novel perfluoroether-forming reactions and to the products produced thereby. In a more particular aspect, this invention concerns itself with new addition reactions of fluoroxy groups to unsaturated perfluorocarbon bonds which are induced through photolysis. The resultant products find utility for applications in a variety of instruments and devices in the electrical-electronic, air space, chemical and communication industries. For example, the products of this invention can be used as a heat or pressure transfer medium, an inertia-compensating medium or a dielectric coolant.

The increased interest and use of fluorocompounds for industrial applications has provided an impetus for a continuing research effort in an attempt to develop newer and even more useful products. For example, it is known that addition of fluoroxy groups to perfluoroaromatic compounds results in the synthesis of interesting perfluoroethers. This is exemplified by the addition reaction of trifluoromethyl hypofluorite to hexafluorobenzene at 40° C. for one hour to form bis(trifluoromethyl) peroxide as the main by-product and a mixture of 1,4- and 1,2-monofluoroxy adducts.

In continuing the above research, it was unexpectedly found that novel and even more interesting perfluoroethers could be synthesized by utilizing photolysis as a reaction parameter.

The photolytic reactions took place at low temperature resulting in the discovery of novel chemical routes for the synthesis of new perfluoroethers. To be more specific, photolysis created a reaction condition that permitted the addition of perfluorodialkyl peroxide and fluoroxyperfluoroalkanes to perfluoroolefins and perfluoroaromatics. The resultant products find utility as fluids for a variety of instruments and devices and as liquid scavengers for neutral and ionic compounds, particles or pollutants.

SUMMARY OF THE INVENTION

The present invention concerns itself with addition reactions between fluoroxy groups and perfluoroaramatic rings which result in the formation of novel perfluoroethers. The synthesis of these novel perfluoroesthers is achieved by effecting a reaction under photolysis at low temperature. The reactions involve perfluorodialkyl peroxides, fluoroxyperfluoroalkanes and perfluoroolefins and perfluoroaromatics.

Accordingly, the primary object of the invention is to provide new chemical routes for the synthesis of perfluoroethers.

Another object of this invention is to provide novel perfluoroether compounds that find utility such as instrumentation fluids because of their chemical and thermal stability and resistance to the degradative effects encountered in chemical, high temperature and radiation environments.

The above and still further objects and advantages of this invention will become more readily apparent upon consideration of the following detailed description of its preferred embodiments.

DESCRIPTION OF THE PREFERRED EMBODIMENTS

In accordance with this invention, it has been found that the above-described objects can be accomplished by effecting photolytic addition reactions between equimolar amounts of certain fluoroxy compounds and perfluoroaromatic compounds.

The novel reactions of this invention evolved from a continuing research effort into developing new perfluoroether-forming processes. During previous investigations, it was reported that the addition reaction of a fluoroxyperfluoroalkane, such as trifluoromethyl hypofluorite to hexaflurorbenzene at 40° C. for one hour formed bis(trifluoromethyl) peroxide as the main by-product and a mixture of 1,4- and 1,2-monofluoroxy adducts. However, in accordance with the teachings of this invention, the same reaction was repeated but under photolysis at the low temperature of −60° C. for 1 hr followed by −20° C. for 1 hr. Gas chromatograph separation of the reaction products revealed the presence of five fractions, which exhibit identical parent mass m/e value of 1254, but with different mass cracking patterns. The fraction with the longest retention time was a minor isomer and a dimer of $(CF_3O)_3C_{12}F_{12}$. The elemental analysis by mass spectroscopic molecular weight (CEC 21-110-B) of $(CF_3O)_3C_{12}F_{12}$: Found, 626.9525. Calculated for $C_{15}F_{21}O_3$, 628.9512.

As a result, additional efforts were made to effect a photolytic reaction between fluoroxyperfluoroalkanes and perfluoroolifins. The success of this effort is shown in the following equations (1) and (2) where trifluoromethyl hypofluorite is reacted with perfluorocyclohexane in equimolar amounts to produce quantitative yields of perfluoromethoxycyclohexane; and perfluoro-t-butyl hypofluorite is reacted with perfluorocyclopentene in equimolar amounts to produce perfluoro-t-butoxycyclopentane.

A. Photolysis of fluoroxyperfluoroalkanes and perfluorocycloolifins

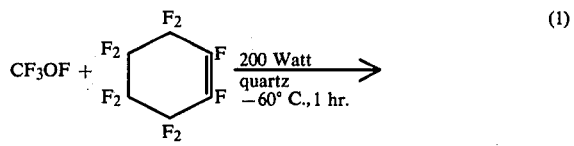
(1)

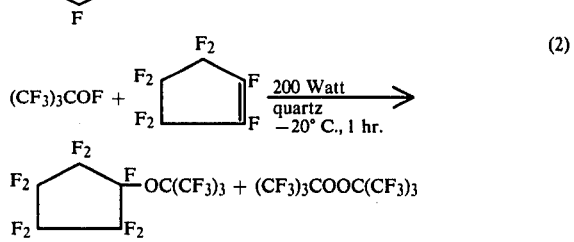
(2)

-continued

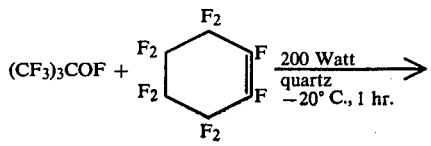
(3)

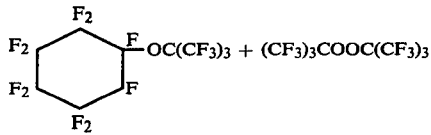

Equation (3) above represents a reaction similar to that demonstrated by equation 2 with the exception that perfluorocyclopentene was replaced by perfluorocyclohexene with all other reaction conditions being equal.

Further research into attempts at effecting photolytic reaction between perfluorodialkyl peroxides and perfluorocycloolefins resulted in the synthesis of two new vicinal perfluorodi(t-butoxy)cycloalkanes. These two new compounds, vicinal perfluorodi(t-butoxy)cyclopentane and vicinal perfluorodi(t-butoxy)cyclohexane are shown as the products of equations (4) and (5) in which bis(perfluoro-t-butyl) peroxide is reacted with perfluorocyclopentene and perfluorocyclohexene in equimolar amounts under a quartz 200-watt mercury arc at −20° C. for one hour. However, in order to synthesize two other novel perfluoroethers as demonstrated in equations (6) and (7) a 2500 watt source is required. The main products are 2,2'-perfluorodi(methyoxycyclopentyl) and 2,2'-perfluorodi(methoxycyclohexyl) which result from reacting bis(trifluoromethyl) peroxide with perfluorocyclopentene and perfluorocyclohexene.

B. Photolysis of perfluorodialkyl peroxides and perfluorocycloolefins

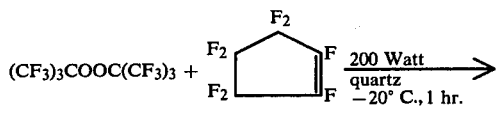
(4)

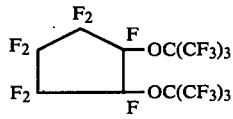

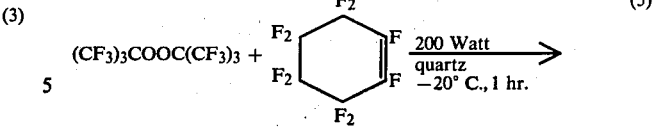
(5)

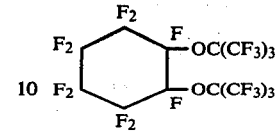

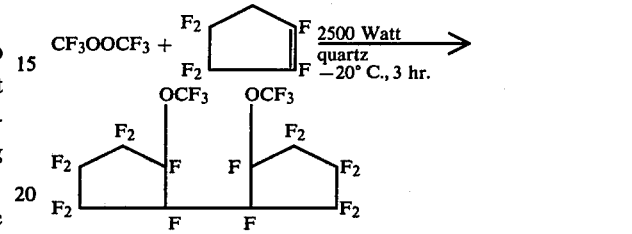
(6)

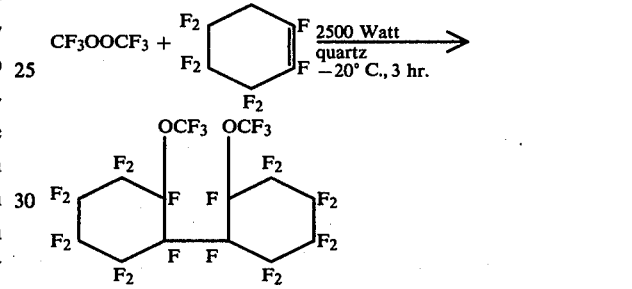
(7)

From a consideration of the foregoing, it can be seen that the present invention provides new chemical routes that comprise a simple and efficient means for preparing novel perfluoroether compounds. These compounds find wide utility in the electronic and chemical industries as fluids for instruments and devices. Their chemical and thermal stability, as well as their resistance to chemicals, thermal and radiation hazards make them especially amenable for use in modern day high speed and high altitude aircraft.

while the invention has been described with particularity in reference to specific embodiments thereof, it is to be understood that the disclosure of the present invention is for the purpose of illustration only, and is not intended to limit the invention, the scope of which is defined by the appended claims.

What is claimed is:

1. As a compound, 2,2'-perfluorodi(methoxycyclopentyl).

2. As a compound, 2,2'-perfluorodi(methoxycyclohexyl).

* * * * *